United States Patent
Chapman (10) Patent No.: US 11,099,464 B2
(45) Date of Patent: Aug. 24, 2021

(54) CAMERA DOLLY ELECTRICAL SYSTEM

(71) Applicant: CHAPMAN/LEONARD STUDIO EQUIPMENT, INC., North Hollywood, CA (US)

(72) Inventor: Leonard T. Chapman, North Hollywood, CA (US)

(73) Assignee: CHAPMAN/LEONARD STUDIO EQUIPMENT, INC., North Hollywood, CA (US)

( * ) Notice: Subject to any disclaimer, the term of this patent is extended or adjusted under 35 U.S.C. 154(b) by 0 days.

(21) Appl. No.: 16/831,162

(22) Filed: Mar. 26, 2020

(65) Prior Publication Data

US 2020/0319535 A1    Oct. 8, 2020

Related U.S. Application Data

(63) Continuation-in-part of application No. 16/542,114, filed on Aug. 15, 2019.

(60) Provisional application No. 62/830,925, filed on Apr. 8, 2019.

(51) Int. Cl.
| | |
|---|---|
| *G03B 17/56* | (2021.01) |
| *B66F 3/25* | (2006.01) |
| *B60R 16/033* | (2006.01) |

(52) U.S. Cl.
CPC .............. *G03B 17/561* (2013.01); *B66F 3/25* (2013.01); *B60R 16/033* (2013.01)

(58) Field of Classification Search
CPC ........ G03B 17/561; B66F 3/25; B66F 11/048; B60R 16/033; H04N 5/2251
See application file for complete search history.

(56) References Cited

U.S. PATENT DOCUMENTS

| | | | |
|---|---|---|---|
| 3,168,284 A | 2/1965 | Fisher | |
| 4,360,187 A | 11/1982 | Chapman | |
| 5,037,068 A * | 8/1991 | Grottesi | B66F 11/048 254/8 B |
| 5,121,200 A * | 6/1992 | Choi | B60R 1/00 348/148 |
| 5,197,700 A | 3/1993 | Chapman | |
| 6,053,476 A | 4/2000 | Chapman | |
| 6,109,626 A | 8/2000 | Chapman | |

(Continued)

OTHER PUBLICATIONS

Extended European Search Report dated Sep. 9, 2020 for Application No. 20166112.1, 6 pages.

*Primary Examiner* — Luong T Nguyen
(74) *Attorney, Agent, or Firm* — Perkins Coie LLP; Kenneth H. Ohriner (57) ABSTRACT

A camera dolly includes a folding arm having a lower end of a first arm section pivotally attached to the chassis, and a lower end of a second arm section pivotally attached to an upper end of the first arm section. A hydraulic system includes a pump, an accumulator and a hydraulic cylinder connected to the first arm section. An arm drive system in the first arm section rotates the second arm section relative to the first arm section. The arm drive system may use chains and sprockets. An electrical system includes a battery contained within a lower rear opening of the chassis. The motor and an AC to DC converter are electrically connected to a motor mechanically connected to the pump. The pump is operated by the motor, and the motor is electrically powered by the battery and/or the AC to DC converter.

7 Claims, 10 Drawing Sheets

(56) References Cited

U.S. PATENT DOCUMENTS

| | | | |
|---|---|---|---|
| 6,280,170 B1 | 8/2001 | Furuya et al. | |
| 6,626,117 B1 | 9/2003 | Chapman | |
| 7,128,479 B2 * | 10/2006 | Chapman | B60R 11/04 396/428 |
| 8,465,103 B2 * | 6/2013 | Burt | B62D 55/06 298/17 R |
| 8,550,632 B2 * | 10/2013 | Chapman | F16M 11/28 352/243 |
| 8,727,318 B2 | 5/2014 | Chapman | |
| 8,870,197 B2 * | 10/2014 | John | B60S 13/02 280/79.4 |
| 2005/0191050 A1 | 9/2005 | Chapman | |
| 2009/0145696 A1 * | 6/2009 | Bergmeier | B66F 9/07559 187/222 |
| 2012/0051733 A1 | 3/2012 | Chapman | |
| 2012/0070143 A1 | 3/2012 | Chapman et al. | |
| 2014/0015223 A1 | 1/2014 | Banwart | |
| 2015/0175182 A1 | 6/2015 | Chapman | |
| 2015/0309394 A1 | 10/2015 | Janze et al. | |
| 2017/0123296 A1 | 5/2017 | Chapman | |
| 2017/0222474 A1 * | 8/2017 | Kefalos | H02J 7/00 |
| 2019/0033691 A1 | 1/2019 | Li et al. | |

\* cited by examiner

CAMERA DOLLY ELECTRICAL SYSTEM

CROSS-REFERENCE TO RELATED APPLICATION

This application is a continuation-in-part of U.S. patent application Ser. No. 16/542,114 filed Aug. 15, 2019 and now pending, which claims priority to and the benefit of U.S. Provisional Application No. 62/830,925, filed Apr. 8, 2019. These applications are incorporated herein by reference.

BACKGROUND OF THE INVENTION

The field of the invention is camera dollies. More specifically, the application relates to an electrical system in a camera dolly. Many camera dollies have an arm or column which is raised and lowered via an actuator, which is often a hydraulic cylinder. In this type of camera dolly or pedestal, the hydraulic cylinder is powered by a hydraulic system including a pump and an accumulator. The pump is driven by an electric motor. Operating the pump charges the accumulator to maintain sufficient hydraulic pressure to operate the cylinder. To allow for near silent operation, during filming the electric motor and the pump are switched off. The accumulator is charged by switching the electric motor and the pump on typically only during time intervals between actual filming.

The electric motor is typically powered by 110 or 220 VAC wall current. However, this of course requires that the camera dolly be connected to a power cable, which can be inconvenient, and which can interfere with maneuvering the camera dolly, as may be needed to follow actors or a filmed action sequence. In addition, often wall current is not available, for example when filming outdoors. Alternatively, the accumulator can be charged using a manual pump built into the hydraulic system of the camera dolly, although this is slower than pumping via the electric motor. The manual pump also requires substantial human effort. Although these types of camera dollies have performed well in the past, an improved camera dolly providing more versatile operation is needed.

SUMMARY OF THE INVENTION

A camera dolly includes an electrical system for powering a hydraulic system for raising and lowering the camera dolly arm or pedestal. The electrical system has an on-board battery, such as a lithium battery, contained within the camera dolly chassis. The dimensions and mechanical configuration of the camera dolly may optionally remain unchanged by the addition of the electrical system and lithium battery. As a result, existing camera dollies may be retrofitted with the present electrical system. The present electrical system provides a camera dolly with on-board electrical power for powering the hydraulic system. The camera dolly consequently can operate for extended periods of time without access to wall current or other electrical power source such as an auxiliary battery, and without using a manual pump for the hydraulic system. Indeed, the manual pump may be omitted entirely. Omitting the manual pump provides additional space in the chassis for the on-board battery and other electrical system components.

In one aspect, a camera dolly chassis has a left frame, a right frame, and a rear frame. An arm is pivotally attached to the chassis. A hydraulic system includes a pump, an accumulator and a hydraulic actuator connected to the arm, for raising and lowering the arm. The pump and the accumulator are in the left frame. The hydraulic system also may have one or more auxiliary air tanks in the left frame. An electrical system in the camera dolly includes an on-board battery installed into the right frame, and AC to DC converter electrically connected to a pump motor which drives the pump. The on-board battery powers the pump motor. Alternatively, if 110 or 220 VAC wall current is available and used, the AC to DC converter converts 110 or 220 VAC wall current to direct current to operate the pump motor. Wall current may be used to charge the on-board battery via a battery charger optionally supported on the chassis, or on a handle on the chassis.

In another embodiment, a camera dolly includes a folding arm having a lower end of a first arm section pivotally attached to the chassis, and a lower end of a second arm section pivotally attached to an upper end of the first arm section. A hydraulic system includes a pump, an accumulator and a hydraulic cylinder connected to the first arm section. An arm drive system in the first arm section rotates the second arm section relative to the first arm section. The arm drive system may use chains and sprockets. An electrical system in the camera dolly includes a battery contained within a lower rear opening of the chassis. The motor and an AC to DC converter are electrically connected to a pump motor mechanically connected to the pump. The camera dolly typically has no manually operated hydraulic pump. Thus, the pump is operated only by the electric pump motor, and the pump motor is electrically powered only by the battery, or by the AC to DC converter if 110 or 220 VAC wall current is available and used.

Other objects, features and advantages will become apparent from the following detailed description, which is provided by way of explanation and is not intended to indicate the limits of the invention.

BRIEF DESCRIPTION OF THE DRAWINGS

In the drawings, the same reference number indicates the same element in each of the views.

DETAILED DESCRIPTION

Figure 1:
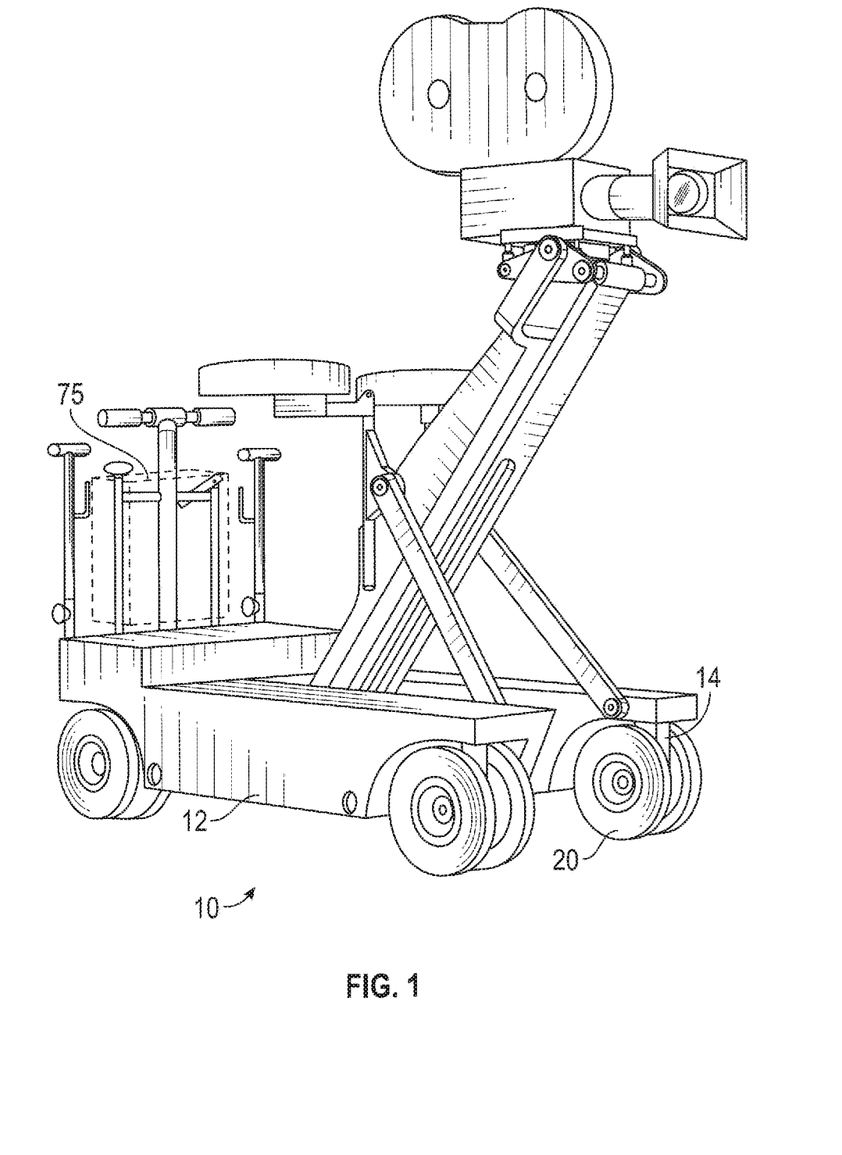
FIG. 1 is a front and right side perspective view of a camera dolly.
Figure 2:
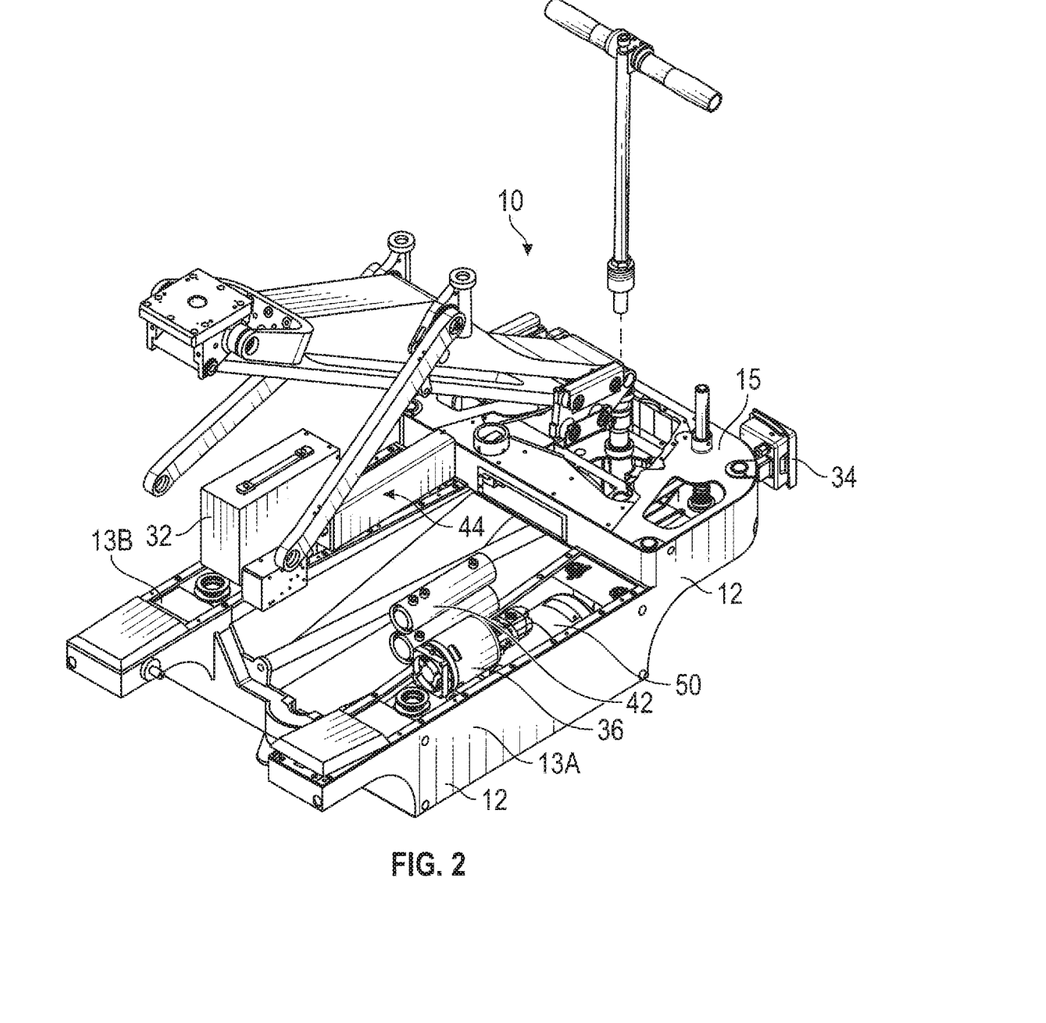
FIG. 2 is a front, top and left side exploded perspective view of a the camera dolly of FIG. 1 with various components omitted for purpose of illustration.
Figure 3:
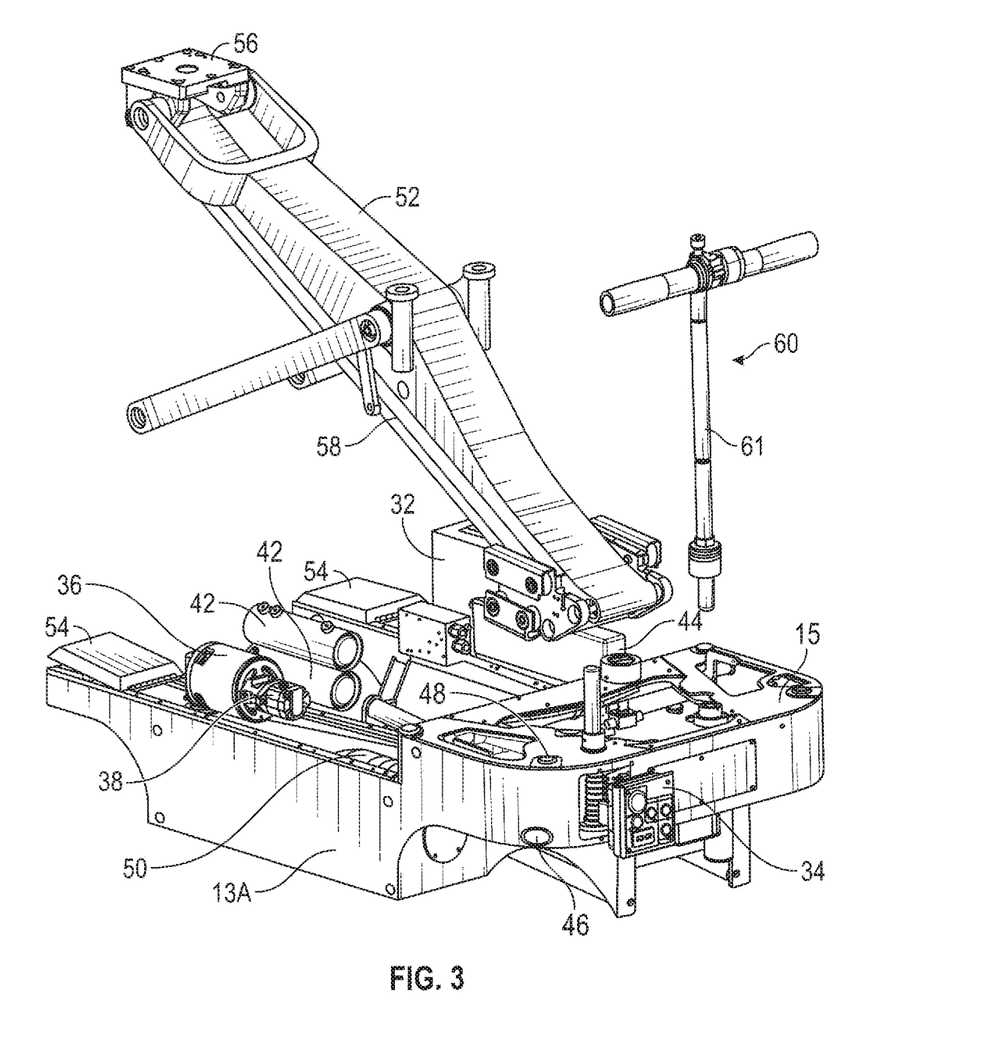
FIG. 3 is a rear, top and left side exploded perspective view of the camera dolly shown in FIGS. 1 and 2 with various components omitted for purpose of illustration.
Figure 4:
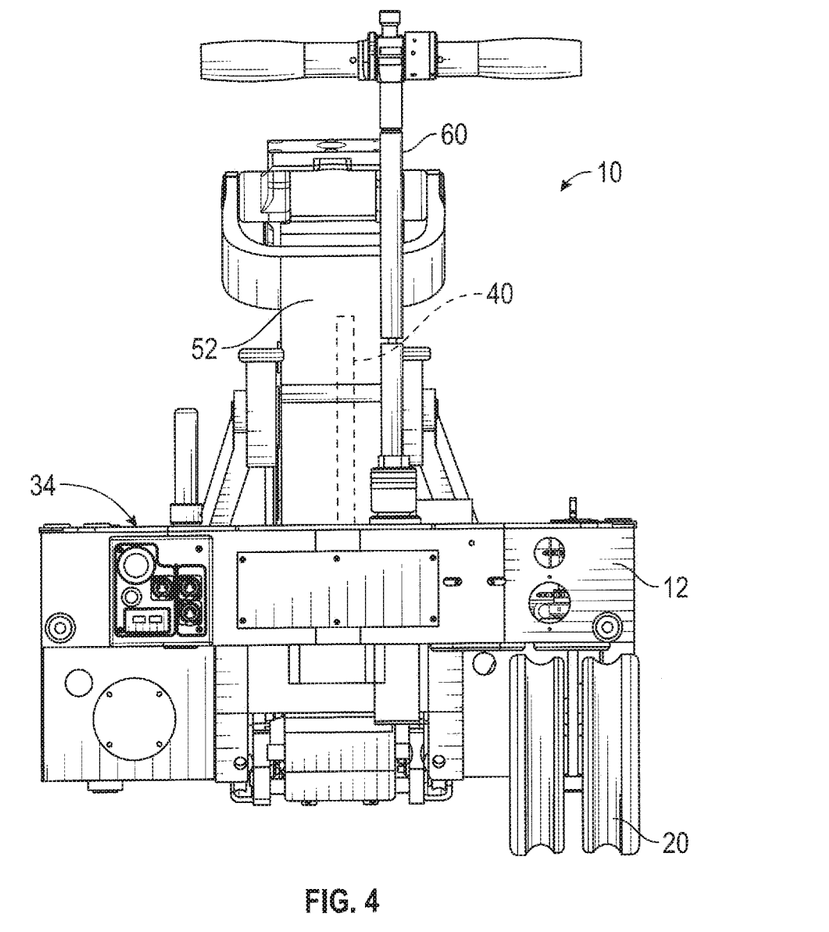
FIG. 4 is a rear view of the camera dolly shown in FIGS. 1-3 with various components omitted for purpose of illustration.

Turning now in detail to the drawings, as shown in FIGS. 1-4, a camera dolly 10 has a chassis 12 with a kingpin 14 at or near each of the corners of the camera dolly 10. The chassis may be generally U-shaped, having left and right frames or sections 13A, 13B, and a rear frame or section 15. A pair of wheels 20 is rotatably supported on axles on opposite sides of each kingpin 14. Some dollies may use a single wheel on each kingpin. In FIGS. 2-3 and at the left side of FIG. 4, the wheels and kingpins and other components are omitted for purpose of illustration. A steering system has chains or belts engaged with each kingpin for steering the camera dolly 10. Referring to FIGS. 2-3, the steering system includes a steering transmission in the rear section 15 and a steering handle 60, for example as described in U.S. Pat. No. 6,109,626, incorporated herein by reference. A clutch 61 may be included in the shaft of the steering handle 60 to limit the torque that the handle 60 can apply to the steering system, to help avoid damaging the steering system via excessive force. As shown in FIG. 3, a hinged door 54 may be provided over each kingpin to allow quick access to a clutch clamp on each kingpin, for releasing the kingpin from engagement with the steering chains or belts. This allows the kingpin to pivot freely, when the camera dolly 10 is used on track and steering is deactivated.

The arm 52 is pivotally attached to the chassis of the camera dolly and is raised and lowered via a hydraulic cylinder 40 driven by a hydraulic system including a pump 38 driven by an electric pump motor 36, an accumulator 50, a pressure gauge 48, and valves, for example as described in U.S. Pat. No. 4,360,187, incorporated herein by reference. Auxiliary air tanks 42 may be added to the hydraulic system to increase the capacity of the system. These hydraulic system components may be contained within the left frame 13A. A camera platform 56 at the end of the arm remains horizontal regardless of the arm position via a parallelogram leveling linkage 58.

As shown in FIGS. 2-5, the camera dolly 10 has an electrical system for powering the pump motor 36, and for also charging and using the on-board battery 32 which may be contained within right frame 13B the chassis 12. The electrical system may also power accessories used with the camera dolly. The on-board battery 32 may be a re-chargeable lithium battery made up of multiple cells. The on-board battery 32 is electrically connected to the motor 36 and to a charging connector 70 on a connector panel 34 at the back of the chassis. The on-board battery 32 may be charged using a charger 75. The charger 75, if used, may be suspended or attached in a pouch to the rear push handles of the camera dolly as shown in FIG. 1. In use, the on-board charger 75 is supplied with 110 or 220 VAC wall current via a cable, and outputs 32 VDC charging current to the battery 32 via a short cable plugged into a charging connector 70.

An AC to DC converter 44 is wired to the motor 36 and to an AC socket 46 on the camera dolly (shown in FIG. 3), to power the motor, by connecting the AC socket 46 to 110/220 VAC with a cable. In this case the converter 44 converts 110/220 VAC to 32 VDC, which is used to power the motor. The motor 36 can operate using electrical power from either the battery 32 or the AC to DC converter 44, with necessary switching provided automatically via electrical design of the camera dolly and its wiring system.

Figure 5:
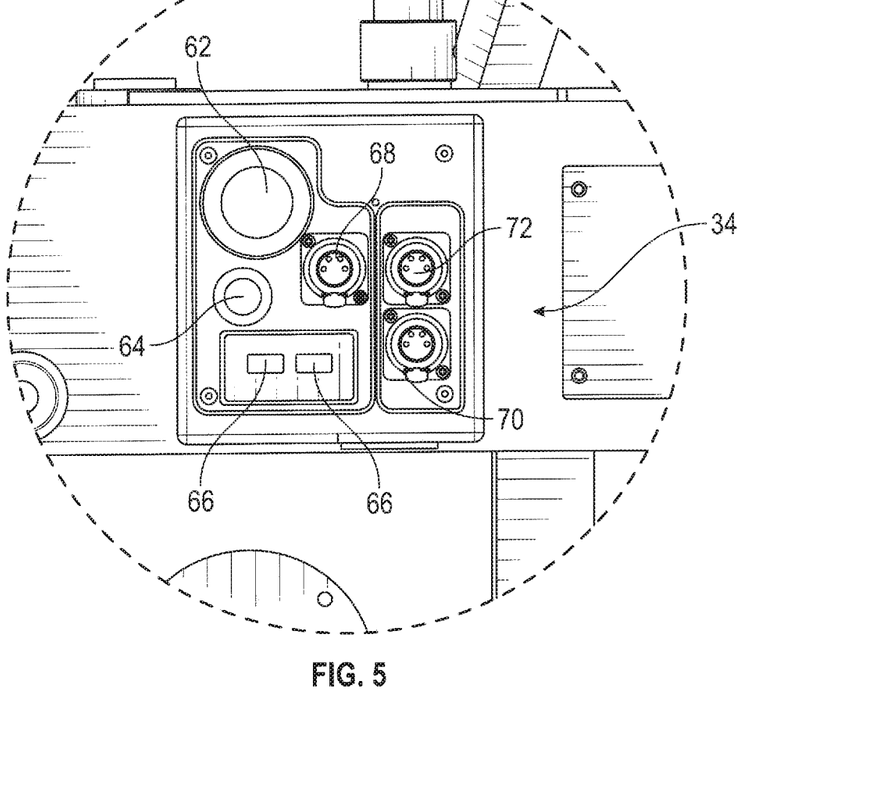
FIG. 5 is an enlarged view of the connector panel shown in FIG. 4.

As shown in FIG. 5, the connector panel 34 includes a voltmeter 62 which displays the voltage of the battery 32 under load. Typically, a voltage under load of less than 31.5 VDC indicates the battery 32 should be recharged. An on/off switch 64 controls operation of the motor 36. Although the motor 36 and pump 38 are relatively quiet, the motor 36 is typically only switched on to charge the accumulator before or after actual filming or recording, to avoid creating any noise during filming. The motor 36 and the pump 38 may be instantaneously switched off, via operation of the switch 64. The switch 64 may optionally be positioned on the rear right side of the camera dolly, opposite from the connector panel, or it may be a remotely operated switch. The switch 64 switches all electrical power on or off. An accessory power out connector 68 is connected into the electrical system of the camera dolly to provide 12 VDC power to an accessory such as a monitor. This allows the accessory to be used on the camera dolly without having a separate accessory battery.

As shown in FIGS. 2-4 of U.S. Pat. No. 6,109,626, steering chains or belts extend through the left and right frames. The battery 32 may be contained in a space or compartment below the chains in the left and right frames. In ordinary use, the battery 32 is permanently positioned within the frame (i.e., it is not removed except during major maintenance servicing). However, the battery 32 may be removed by loosening and repositioning idler sprockets. This provides sufficient slack in the steering chains to allow the steering chains to be displaced, creating clearance for removal of the battery 32.

An external battery connector 72 on the panel 34 is provided to allow an external battery box 90 to be connected to the electrical system of the camera dolly, for driving the motor 36, typically for use if the on-board battery 32 is discharged and not able to drive the motor 36, and 110 or 220 VAC wall current is not available. In this case, the external battery box 90 is connected into the electrical system via a cable plugged into the connector 72, to provide 32 VDC to the pump motor 36.

Two USB plugs 66 on the panel 34 may provide 5 VDC output for charging or powering smaller devices, such as phones and tablets. The electrical system has components and circuits for providing the voltages discussed above. The electrical system may be designed so that the pump motor 36 is powered only by the battery 32, and not by any external power source, with the AC to DC converter 44 omitted. In this case, the battery 32 is charged via 110 or 220 VAC wall current connected to the charger 75. The pump motor may also be operated using an external battery box 90.

The on-board battery 32 may be 20 to 40 Amp Hour 32 VDC battery. A 30 Amp Hour 32 VDC battery provides for about 45 lifts of the arm 52. Operation of the motor 36 can charge the hydraulic system from about 20,000 kPa (2900 psi) at idle to 22,800 kPa (3300 psi) at full pressure, in less than one minute, where the motor is a 750 W motor. The pressure gauge 48 provides an indication of how many lifts the hydraulic system can provide before it needs recharging.

Figure 7:
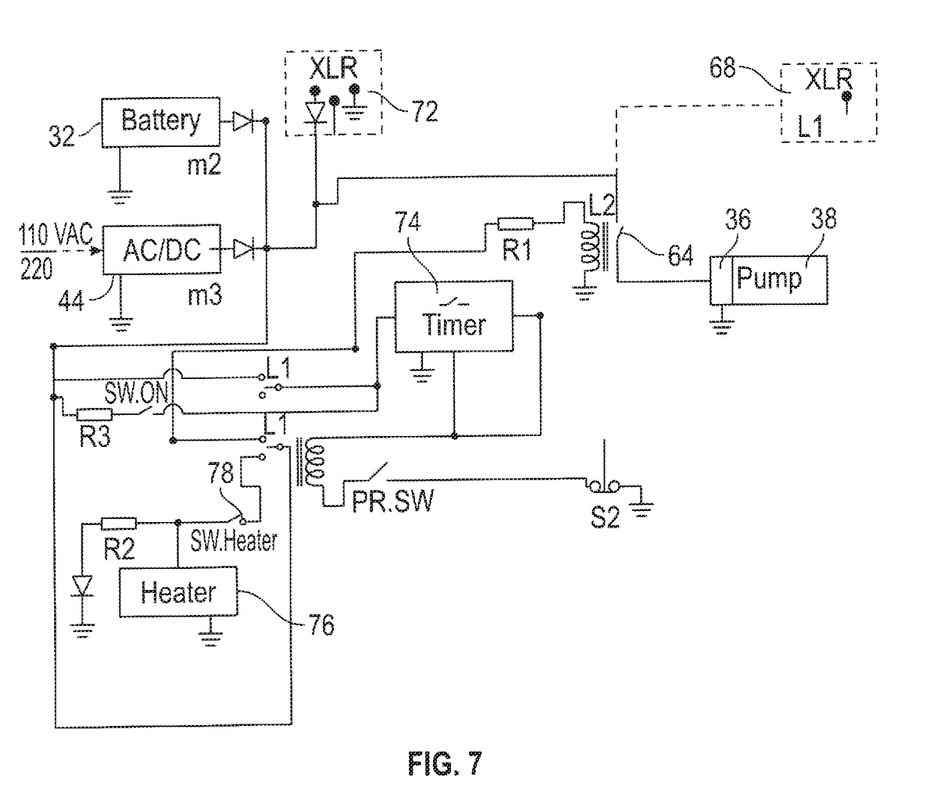
FIG. 7 is a schematic example of the electrical system of the camera dolly shown in FIGS. 1-5.

Referring to FIG. 7, a timer 74 may be included in the electrical system to automatically limit operation of the motor 36 to a pre-selected time interval, such as 60 to 120, or 90 seconds. The timer 74 limits inadvertent overcharging of the hydraulic system, by limiting the duration of operation of the pump, in the event that other pressure limiting components, such as pressure switches, become inoperative. A heater 76 may be included in the electrical system for heating the hydraulic fluid, when the camera dolly is in a low temperature environment. In this case, generally the hydraulic fluid is preheated, and remains heated, via use of the heater 76. The heater 76 may be manually turned on and off via a heater switch 78.

Figure 6:
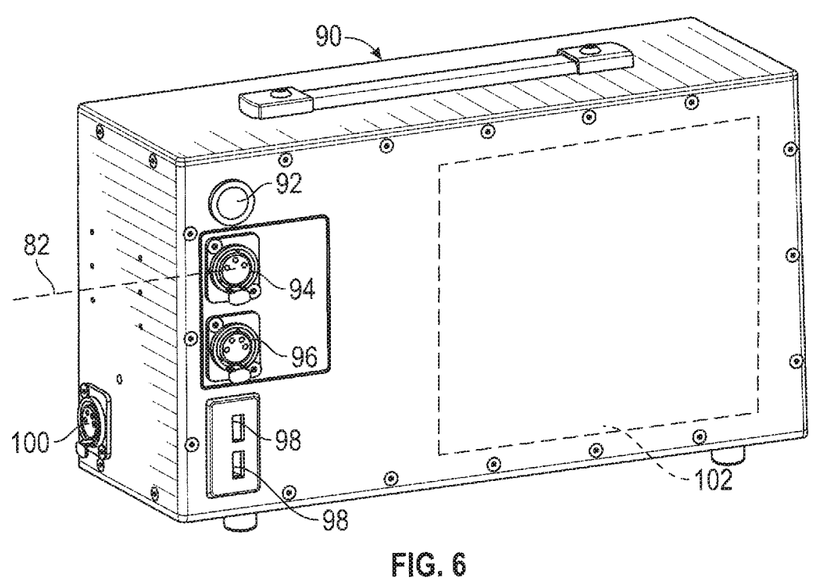
FIG. 6 is a front perspective view of an external battery box for use with the camera dolly shown in FIGS. 2-5.

FIG. 6 shows an external battery box 90 which may be used with the camera dolly 10. The external battery box 90 contains a battery 102 which may also be a lithium battery. The battery 102 is charged via 110/220 VAC supplied through connector 100 to a converter inside of the box 90.

The external battery box 90 can be used to power the motor in the camera dolly by connecting it via a cable 82 from connector 94 to the connector 72 on the camera dolly 10. The external battery box may also power an accessory via the connector 96. USB connectors 98 may power or charge smaller devices. An illuminated switch 92 switches electrical connections to the battery 102 between the connectors 100 and 94-98.

Figure 8:
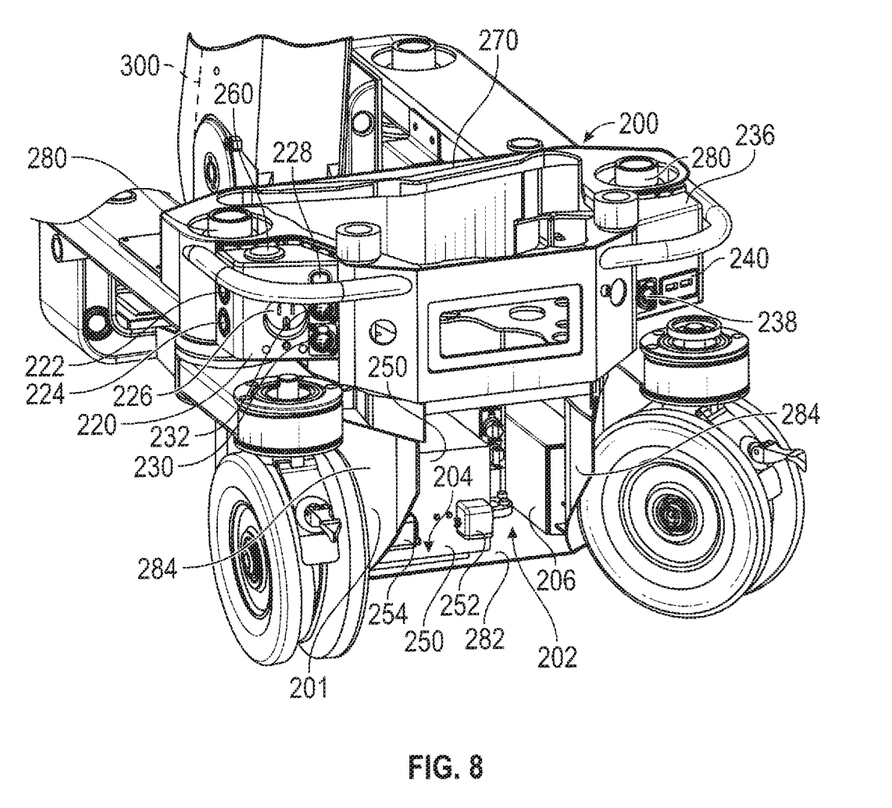
FIG. 8 is a rear and left side partial perspective view of an alternative camera dolly embodiment, with components removed for purpose of illustration.
Figure 9:
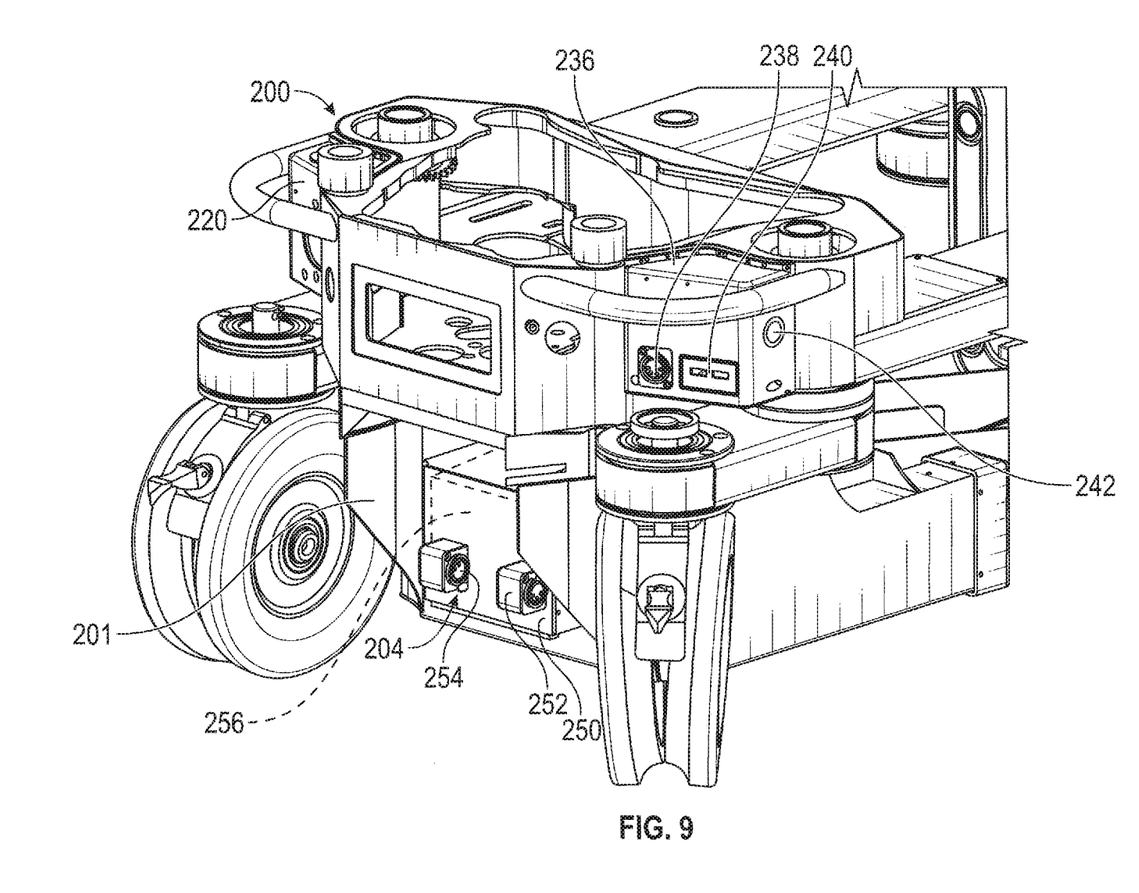
FIG. 9 is a rear and right side partial perspective view of the camera dolly of FIG. 8.

Turning to FIGS. 8 and 9, another camera dolly embodiment 200 is similar to the camera dolly described in U.S. Pat. No. 6,109,626, incorporated herein by reference, with modifications as described below. The manually operated hydraulic pump (e.g., pump 151 in U.S. Pat. No. 4,360,187 or the hand pump 174 in U.S. Pat. No. 8,727,318) is removed from the lower chassis opening 202 in the chassis 201 of the camera dolly 200, between the rear leg shafts 280. The hydraulic oil tank previously located in or adjacent to the opening or space 202 is removed and replaced with integral oil tank 270 built into the chassis 201 further forward in the chassis, in front of the space 202. The lower chassis opening 202 is formed by a chassis bottom plate 282 between chassis sidewalls 284.

Figure 10:
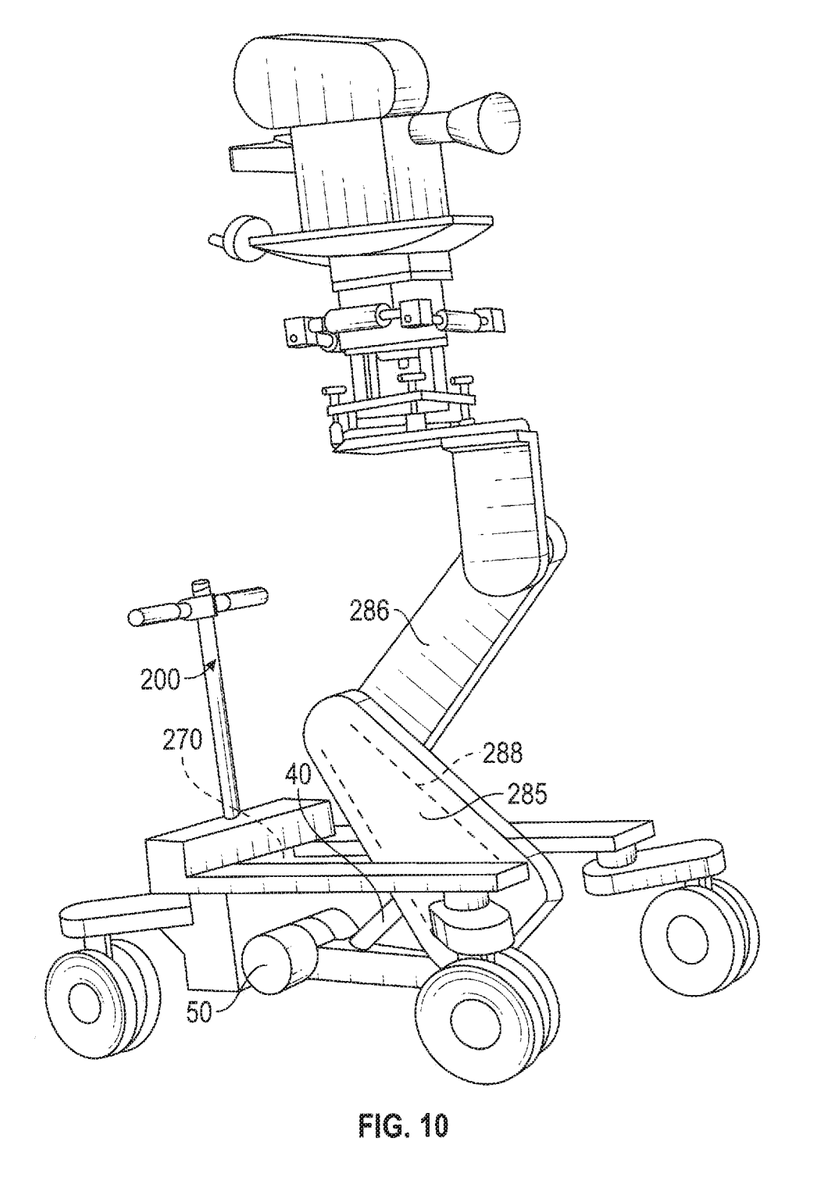
FIG. 10 is a perspective schematic view of the camera dolly of FIGS. 8-9.

The camera dolly 200 has an articulated or folding-type arm. A lower end of a first arm section 285 is pivotally attached to the chassis, and a lower end of a second arm section 286 is pivotally attached to an upper end of the first arm section. An arm drive system 288 may use chains and sprockets. A hydraulic system includes a pump, an accumulator and a hydraulic cylinder connected to the first arm section. Referring to FIG. 10, as the piston off the hydraulic cylinder extends, the first arm section 285 is rotated upwardly (clockwise in FIG. 10). The arm drive system 288 corresponding rotates the second arm section 286 in the opposite direction. A levelling system in the second arm section, which may also include chains and sprockets, keeps the camera platform level.

A battery unit 204 and an AC to DC converter 206 are provided in the opening 202. The battery unit 204 includes a plurality of lithium battery cells (not shown) forming a 32 VDC battery 256 within a battery housing 250. The battery housing 250 may be a rectangular box typically about 23 cm long by 14 cm wide by 10 cm high, to allow the battery unit 204 to fit into the opening or space 202. A power output connector 252 and a charging connector 254 are provided on the front of the battery housing and are electrically connected internally to the battery 256.

As shown in FIG. 8, a charging box 220 is attached to the rear left side of the chassis 201. A pump on switch 222 and a pump off switch 224 are provided on the side of the charging box 220. These switches switch the motor 36 driving the hydraulic pump 38 on and off, regardless of the source of electrical power provided to the motor 36. The pump 38 is able to pressurize the hydraulic system from a nominal low (non-operable) pressure of 20,000 kPa (2900 psi) to a nominal maximum pressure of 25000 kPa (3600 psi) in less than 35 seconds compared to about 50-55 seconds in prior designs. This allows the hydraulic cylinder 40 to perform seven complete arm lifts without switching the motor 36 on to increase the pressure in the hydraulic system, in comparison to three lifts in prior designs. The lifting capacity of the camera dolly 200 is also increased to 225 Kg. The folding arm of the camera dolly 200 contains sprockets and a chain, as described for example in U.S. Pat. No. 6,053,476, incorporated herein by reference. The camera dolly 200 may use the same design, but with a silent chain 300 having stacked rows of flat tooth-shaped driving links meshed with the sprockets.

Referring still to FIG. 8, an AC socket 226, a heater switch 228, a power in connector 230 and a charger connector 232 are provided on the back of charging box 220. A pressure gauge 260 on the top of the charging box 220 displays the hydraulic system pressure, which informs the number of arm lifts remaining. As shown in FIG. 9, a switch box 236 is attached to the right rear side of the chassis 201. The switch box 236 may be shaped as a mirror image of the charging box 220, with the chassis 201 generally symmetrical about its centerline, at the back of the chassis where the charging box 220 and the switch box 236 are attached. An auxiliary power connector 238 providing 12 VDC output and two USB connectors 240 are provided on the back of the switch box 236. A power switch 242 is provided on the side of the switch box 236. The auxiliary power connector provides 12 VDC for use with camera accessories. The USB connectors may be used to charge phones or other devices used by the crew. The power switch 242 switches the entire camera dolly electrical system on or off.

A wiring harness inside of the chassis 201 electrically connects the components described above, as shown in FIG. 7. The camera dolly 200 has no manually operated hydraulic pump. The hydraulic pump 38 is driven only by the pump motor 36. The pump motor 36 is electrically powered either by the battery 256, or by the AC to DC converter 206 receiving power from an external source such a wall current via a cable plugged into the AC socket 226. The pump motor may also be powered by the external battery box 90 plugged into the connector 230. The design, features and operation of the electrical system of the camera dolly 200 may be the same as the camera dolly 10, except as discussed above, and vice versa. The design elements described above may also be used in a hydraulic camera pedestal, wherein a telescoping column is used in place of a pivoting camera dolly arm, for example as disclosed in U.S. Pat. No. 5,197,700, incorporated herein by reference.

Thus, a novel camera dolly has been shown and described. Various changes and substitutions may of course be made without departing from the spirit and scope of the invention. The invention, therefore, should not be limited, except by the following claims and their equivalents.

The invention claimed is:

1. A camera dolly, comprising:
   a chassis;
   a folding arm having a lower end of a first arm section pivotally attached to the chassis, and a lower end of a second arm section pivotally attached to an upper end of the first arm section;
   a hydraulic system including a hydraulic pump, an accumulator and a hydraulic cylinder, the hydraulic cylinder connected to the first arm section;
   an arm drive system in the first arm section which rotates the second arm section relative to the first arm section;
   an electrical system including a battery contained within a lower rear opening of the chassis, an electric motor mechanically connected to the pump, and an AC to DC converter electrically connected to the battery;
   a charging box attached to the chassis, the charging box containing an AC wall socket or connector for providing external electrical power from wall current to the electrical system for charging the battery and/or powering the electric motor, the charging box further including a switch for switching the electric motor on or off;
   a switch box on the chassis, the switch box having an electrical system on/off switch, a 12 VDC output connector, and at least one USB 5 VDC output connector, wherein the switch box is on a first side of the chassis and the charging box is on a second side of the chassis, the switch box having a shape which is a mirror image of the charging box; and the camera dolly having no manually operated the hydraulic pump, wherein the hydraulic pump is operated only by the electric motor, and the electric motor is powered only by the battery or the AC to DC converter.

2. The camera dolly of claim 1 wherein the battery comprises 32 VDC lithium cells within a rectangular battery housing, a power output connector and a charging connector on a rear side of the rectangular battery housing.

3. The camera dolly of claim 1 wherein the electric motor is switched between on and off via a single on/off switch, regardless of the charge of the battery.

4. A camera dolly, comprising:
a chassis;
a folding arm having a lower end of a first arm section pivotally attached to the chassis, and a lower end of a second arm section pivotally attached to an upper end of the first arm section;
a hydraulic system including an integral oil tank built into the chassis in front of a space in the chassis between first and second rear leg shafts, a hydraulic pump, an accumulator and a hydraulic cylinder connected to the first arm section;
an arm drive system in the first arm section which rotates the second arm section relative to the first arm section;
an electrical system including a battery contained within a lower rear opening of the chassis, an electric motor and an AC to DC converter electrically connected to the battery, the electric motor mechanically connected to the hydraulic pump;

wherein the camera dolly has no manually operated the hydraulic pump, wherein the hydraulic pump is operated only by the electric motor, and the electric motor is powered only by the battery or the AC to DC converter; and a switch box on a first side of the chassis behind the first rear leg shaft, the switch box having an electrical system on/off switch, a 12 VDC output connector, and at least one USB 5 VDC output connector.

5. The camera dolly of claim 4 further including a charging box on a second side of the chassis behind the second rear leg shaft, the charging box containing an AC wall socket or connector for providing external electrical power from wall current to the electrical system for charging the battery and/or powering the electric motor, the charging box further including a switch for switching the electric motor on or off.

6. The camera dolly of claim 4 wherein the battery comprises 32 VDC lithium cells within a rectangular battery housing, a power output connector and a charging connector on a rear side of the rectangular battery housing.

7. The camera dolly of claim 4 with the electric motor switched between on and off via a single on/off switch, regardless of the charge of the battery.

* * * * *